J. B. HEVERLING.
POWER TRUCK.
APPLICATION FILED FEB. 23, 1909.

941,677.

Patented Nov. 30, 1909.
3 SHEETS—SHEET 1.

WITNESSES

INVENTOR
JOHN B. HEVERLING
ATT'Y.

J. B. HEVERLING.
POWER TRUCK.
APPLICATION FILED FEB. 23, 1909.

941,677.

Patented Nov. 30, 1909.

3 SHEETS—SHEET 3.

WITNESSES

INVENTOR
JOHN B. HEVERLING.
BY
ATTY.

UNITED STATES PATENT OFFICE.

JOHN B. HEVERLING, OF ST. LOUIS, MISSOURI.

POWER-TRUCK.

941,677.  Specification of Letters Patent.  Patented Nov. 30, 1909.

Application filed February 23, 1909. Serial No. 479,481.

*To all whom it may concern:*

Be it known that I, JOHN B. HEVERLING, a citizen of the United States, residing at St. Louis, Missouri, have invented a certain new and useful Improvement in Power-Trucks, of which the following is a full, clear, and exact description, such as will enable others skilled in the art to which it appertains to make and use the same, reference being had to the accompanying drawings, forming part of this specification, in which—

Figure 1:
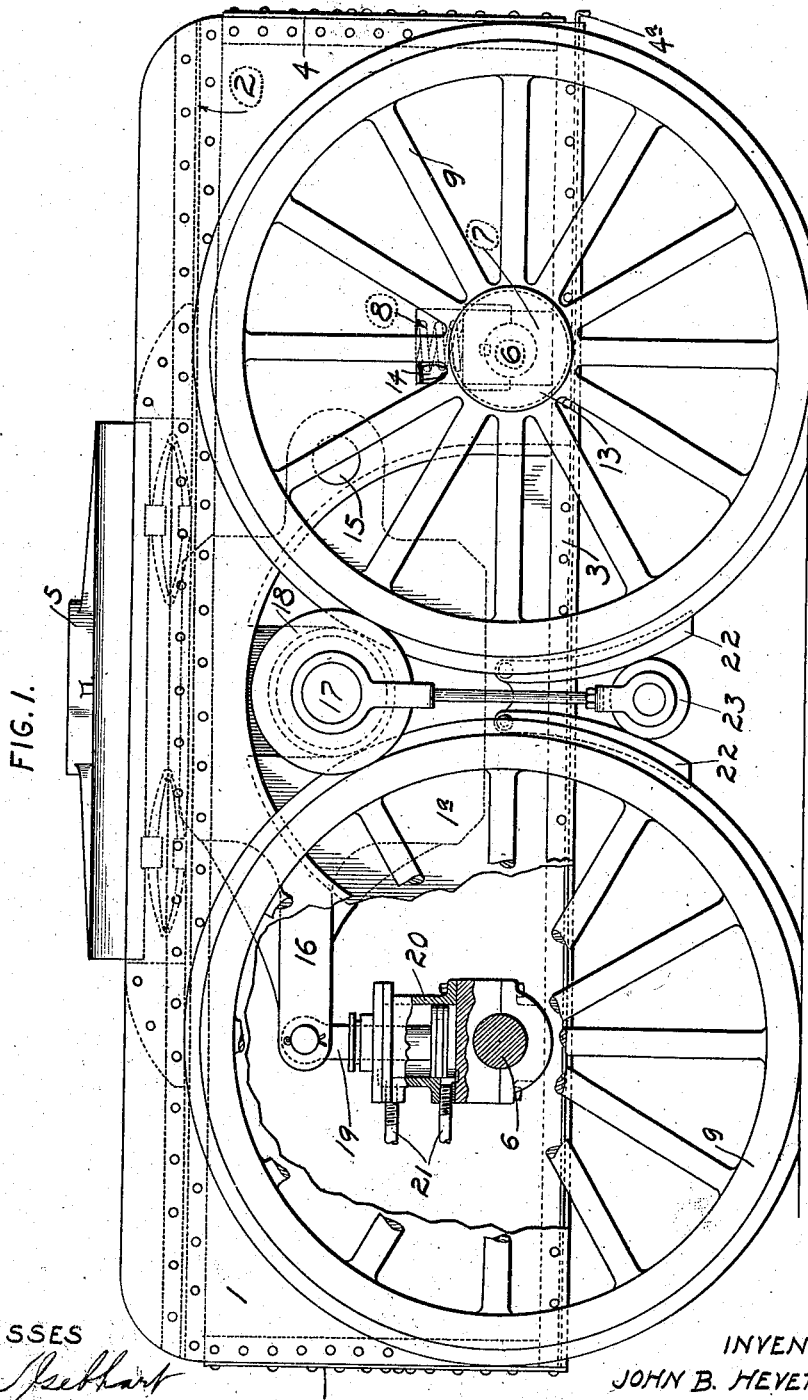
Figure 2:
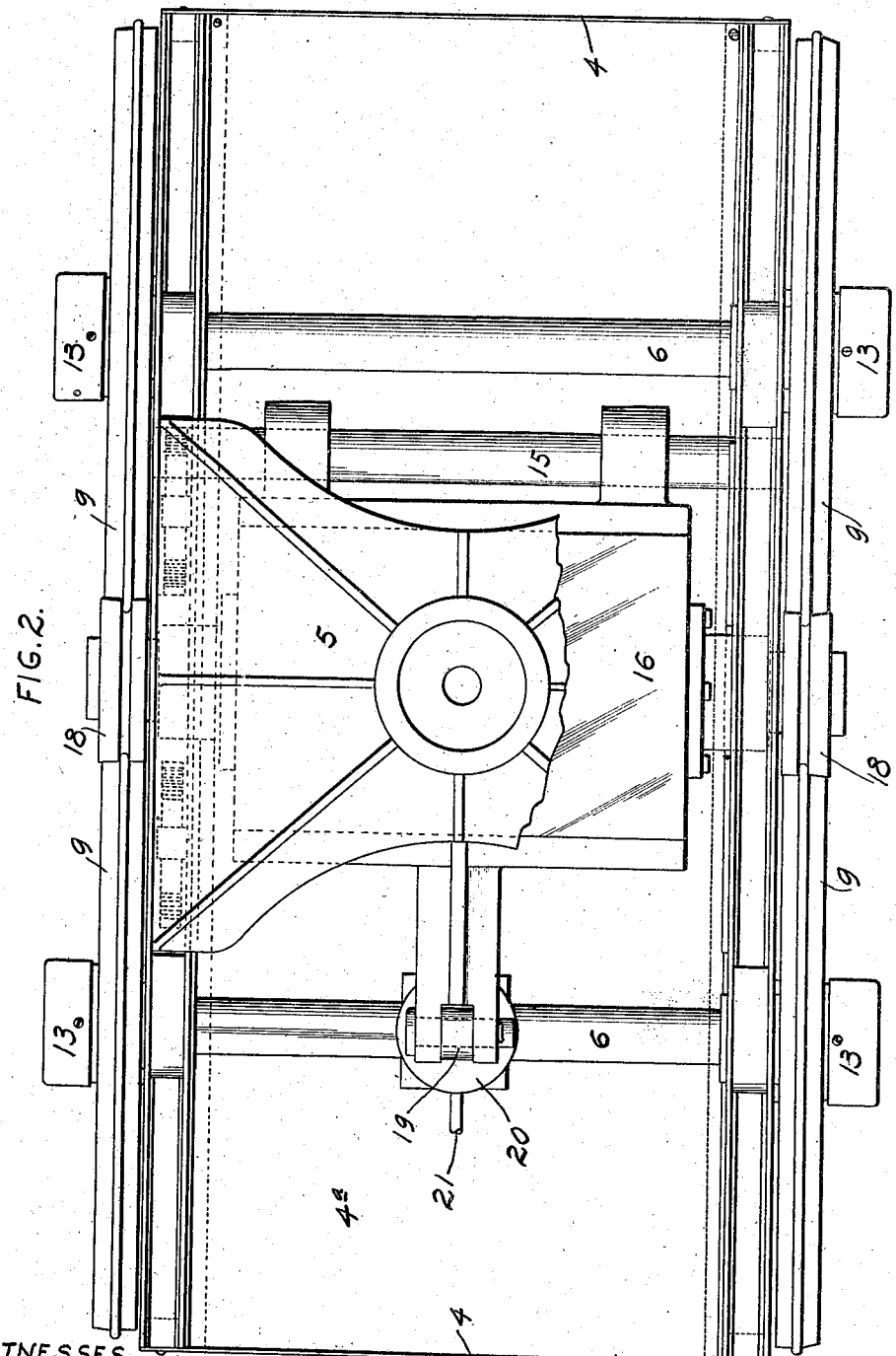
Figure 3:
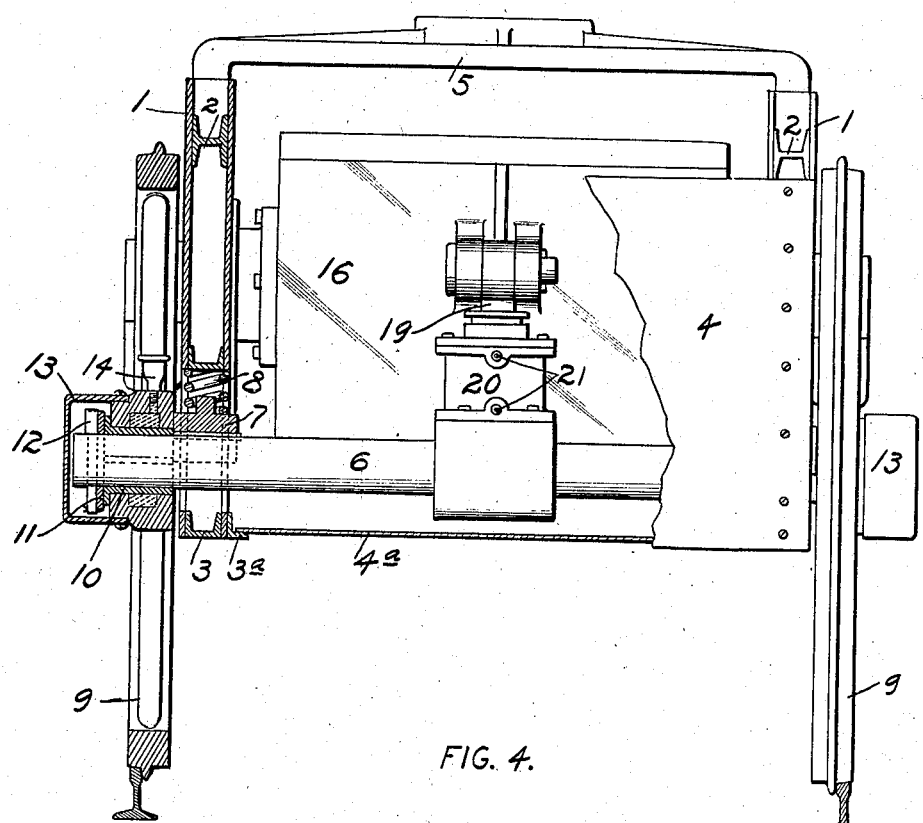
Figure 4:
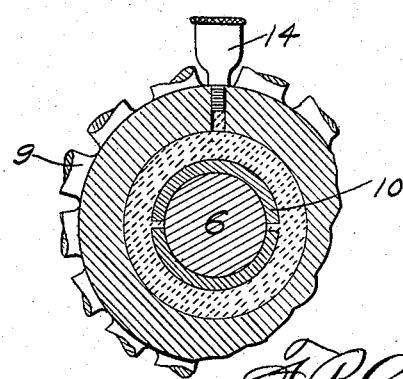

Figure 1 is a side elevational view of my improved power truck. Fig. 2 is a top plan view of the same. Fig. 3 is an end elevational view, partly in vertical section. Fig. 4 is a detailed view illustrating the method of lubricating the traction wheels.

This invention relates to a new and useful improvement in power trucks, the object being to construct a truck in such manner that the driving element is in frictional engagement with the driving or traction wheels, means being provided whereby said friction element may be moved into and out of engagement, and coincidently therewith, operate the brake used in connection with said friction element. The brake can be separately applied, if desired, but I have shown the same operating in conjunction with the device which moves the friction element into and out of engagement.

By my improved method of applying power, it is possible, when the friction element is out of engagement with the driving wheel, to get up speed in the motor, engine or other driving medium for the friction element and then to apply the friction element, running at such high speed, whereupon said friction element will frictionally engage the traction wheels, moving them slowly at first, until the momentum of moving the heavy bodies supported by the truck is overcome, when the friction element gradually takes a firmer hold until finally the driving element attains the same peripheral speed as the peripheral speed of the friction element.

Where an electric motor is used as the power medium, the inertia of the revolving armature is utilized to advantage, as I have found by experiment that although the current be cut off there is enough stored-up energy in the revolving armature to move the truck a considerable distance. Another advantage in a continuously running motor as a driving medium resides in the fact that the highest amount of power of which the motor is capable of developing is available at all times, and in going up steep grades this is an important factor, taken in connection with the friction drive, because while the friction drive might give slightly in meeting obstacles, the motor would continue to run, the constantly applied power of the traction wheels driving them up steep grades, until, of course, the angle at which gravity asserts itself in a backward pull, is reached.

In the drawings, 1 indicates the side frames of my improved truck, which are preferably in the form of plate girders consisting of two vertically disposed parallel plates, riveted or otherwise secured under a compression member 2, preferably in the form of an I-beam, the tension member being in the form of a channel 3. The webs of the plate girder sides are cut away at the center of the truck for the purpose of permitting the friction element to project outside the side frames to engage the friction wheels and also to permit the insertion and removal of the armature where an electric motor is used. Of course, where the wheels are located within the side frames of the truck this cut away portion may or may not be provided, according to the will of the designer.

4 indicates the end plates of the truck frame, and 5 indicates the spring-supported transom carrying center bearing on which the car body is supported. In certain uses, this transom 5 may be omitted. 4ª indicates a floor sheet supported by tension angles 3ª on the inner sides of the plate girders, said floor sheet being removable by sliding it longitudinally out through one end of the truck. The openings in the plate girder sides may also be closed by a plate 1ª, as shown in Fig. 1, in the upper end of which plate 1ª is an opening in which the shaft of the friction element operates.

6 indicates axles mounted in boxes 7 slidingly arranged in guide ways in the truck side frames, the truck being supported on said axle boxes through springs 8.

9 are traction wheels mounted to revolve on the axles 6, said traction wheels having brasses 10 arranged in their hub portions for contact with the axles 6, the wheel and its brasses being held in position by washer 11 and a pin. A housing cap 13 is secured to the hub of the wheel. The hub of the wheel surrounding the brasses 10 is preferably made hollow so as to form an oil chamber which may be filled through the oil cup 14, as shown in Fig. 4. In this way the axles are constantly lubricated.

15 indicates a transverse shaft on which is pivotally supported a frame 16 of a motor. The armature 17 of the motor projects out through both sides of the truck frames and carries friction wheels 18 whose peripheries are preferably so shaped as to conform to the traction wheels and their flanges, if said wheels are provided with flanges as shown in the drawings.

The motor frame 16 is supported in position by means of a piston rod 19, whose piston operates in a cylinder 20. Pipes 21 lead to a three-way valve whereby compressed air or other fluid pressure may be directed to the chamber in cylinder 20, above or below the piston as the case may be, or exhausted from said space, according to the desire of the operator, to lift the frame 16 so that the friction wheels 18 are moved out of engagement with the traction wheels, or lower frame 16 so that its friction wheels 18 are moved into engagement with the traction wheels, in which engaged position pressure may be applied above the piston to increase the pressure of the frictional contact between the parts. Cylinder 20 is preferably mounted on one of the axles 6, as shown in Figs. 2 and 3.

22 indicates brake shoes pivotally hung from the side frames of the truck so as to coöperate with the traction wheels. Suspended from the ends of the armature shaft 17 are rollers 23 which, when the friction wheels 18 are in engagement with the traction wheels, are lowered so that the brake shoes 22 swing inwardly away from the treads of the traction wheels. When, however, the friction wheels 18 are lifted out of engagement with the traction wheels, the rollers 23 are raised and all brakes are applied.

By controlling the pressure above and below the piston in the cylinder 20, by means of suitable valves, whose construction is well known, the friction wheels 18 and the rollers 23 may be moved to an intermediate position where neither friction nor braking power is applied to the traction wheels.

The rod by which the rollers 23 are suspended from the shaft 17 is preferably threaded with right and left threads and jam nuts provided so that by rotating said rods the piston on the rollers 23 may be adjusted. Other means for adjusting the position of the rollers 23 with respect to the armature shaft 17 can be applied, if desired.

I am aware that minor changes in the construction, arrangement and combination of the several parts of my device can be made and substituted for those herein shown and described, without in the least departing from the nature and principle of my invention.

Having thus described my invention, what I claim is:

1. In a power truck, the combination with traction wheels, of a driving element designed to frictionally engage said traction wheels, and means movable with said driving element for applying braking power to said driving wheels.

2. In a power truck, the combination with traction wheels, of a driving element designed to simultaneously engage a pair of driving wheels, brakes mounted between said wheels and means movable with the friction element for applying said brakes.

3. In a power truck, the combination with traction wheels, a driving element arranged between and designed to frictionally engage said traction wheels, a pivotally supported frame on which said friction element is mounted, and means for moving said frame on its pivot whereby said frictional driving element is thrown into, and out of engagement with said driving wheels.

4. In a power truck, the combination with driving wheels, of a friction element coöperating therewith, a pivotally mounted frame on which said friction element is arranged, and fluid actuated means for moving said frame and its carried friction element.

5. In a power truck, the combination with traction wheels, of a driving element coöperating therewith, a pivotally mounted frame on which said driving element is arranged, fluid actuated means for moving said frame and its driving element, brakes for said traction wheels and means carried by said frame for coöperating with said brakes.

6. In a power truck, the combination with traction wheels, of a driving element coöperating directly with said wheels, a motor for operating said driving element, a pivotally mounted frame for supporting said motor, and means for raising or lowering said frame so as to cause the driving element to engage with, or be disengaged from the traction wheels.

7. In a power truck, the combination with side frames and traction wheels, of power device carried by said truck, and a removable floor plate slidingly arranged between the truck side frames.

8. In a power truck, the combination with plate girder side frames having inwardly extending tension flanges and a removable floor sheet slidingly arranged upon said tension flanges.

9. In a power truck, the combination of traction wheels arranged in pairs at each side thereof, a frictional driving element at each side of the truck coöperating with each pair of wheels, a movable frame in which said driving elements are mounted, means for moving said frame toward and from said traction wheels, and brakes for coöperating with said traction wheels when said driving elements are out of engagement.

10. In a power truck, traction wheels on each side thereof, frictional driving elements for driving a pair of traction wheels at each side of the truck, a driving shaft upon which said frictional driving elements are mounted, a movable bearing for said driving shaft, and a fluid-actuated piston for controlling the position of said bearing, whereby the frictional driving elements may be moved into and out of coöperative relation to their traction wheels respectively.

11. In a power truck, pairs of traction wheels arranged at each side thereof, frictional driving elements coöperating therewith, a driving shaft on which said elements are mounted, a pivoted frame carrying said shaft, means also mounted on said frame for driving said shaft, and means coöperating with the free end of said frame for quickly moving the driving elements into and out of driving relation to said traction wheels.

In testimony whereof I hereunto affix my signature in the presence of two witnesses, this 18th day of February, 1909.

JOHN B. HEVERLING.

Witnesses:
F. R. CORNWALL,
LENORE CLARK.